United States Patent
Gee et al.

(10) Patent No.: US 6,527,965 B1
(45) Date of Patent: Mar. 4, 2003

(54) METHOD FOR FABRICATING IMPROVED MIRROR ARRAYS FOR PHYSICAL SEPARATION

(75) Inventors: Dale A. Gee, Los Gatos, CA (US); Xiao Yang, Fremont, CA (US); Abhijeet D. Sathe, Tracy, CA (US)

(73) Assignee: Nayna Networks, Inc., Milpitas, CA (US)

( * ) Notice: Subject to any disclaimer, the term of this patent is extended or adjusted under 35 U.S.C. 154(b) by 109 days.

(21) Appl. No.: 09/780,845

(22) Filed: Feb. 9, 2001

(51) Int. Cl.[7] ............................ B29D 11/00; B23K 26/00
(52) U.S. Cl. ........................ 216/24; 438/463; 438/690; 219/121.69
(58) Field of Search ..................... 216/2, 24, 65, 216/66; 438/7, 33, 68, 462, 463, 464, 460, 712, 719, 734, 690; 219/121.69, 121.72, 121.85

(56) References Cited

U.S. PATENT DOCUMENTS

| | | | |
|---|---|---|---|
| 4,317,611 A | | 3/1982 | Petersen |
| 4,942,766 A | | 7/1990 | Greenwood et al. |
| 5,488,862 A | | 2/1996 | Neukermans et al. |
| 5,629,790 A | | 5/1997 | Neukermans et al. |
| 5,641,416 A | * | 6/1997 | Chadha ............... 219/121.69 |
| 5,648,618 A | | 7/1997 | Neukermans et al. |
| 5,658,710 A | | 8/1997 | Neukermans |
| 5,841,553 A | | 11/1998 | Neukermans et al. |
| 5,861,549 A | | 1/1999 | Neukermans et al. |
| 5,922,224 A | * | 7/1999 | Broekroelofs .......... 219/121.72 |
| 5,969,465 A | | 10/1999 | Neukermans et al. |
| 6,064,779 A | | 5/2000 | Neukermans et al. |
| 6,096,635 A | * | 8/2000 | Mou et al. ................ 438/598 |
| 6,117,347 A | * | 9/2000 | Ishida .......................... 216/17 |
| 6,168,744 B1 | * | 1/2001 | Malshe et al. .............. 264/400 |

FOREIGN PATENT DOCUMENTS

| | | |
|---|---|---|
| WO | PCT/US99/20218 | 3/2000 |
| WO | PCT/US99/21139 | 4/2000 |

OTHER PUBLICATIONS

60/023311, Jul. 31, 1996, U.S. Provisional Application.

* cited by examiner

*Primary Examiner*—Gregory Mills
*Assistant Examiner*—Roberts P Culbert
(74) *Attorney, Agent, or Firm*—Townsend and Townsend and Crew LLP

(57) ABSTRACT

A method for fabricating an array of mirrors disposed on a die from a substrate. The method includes placing a substrate comprising a plurality of die thereon on a stage. Each of the die comprises a plurality of movable mirror devices in an array configuration. Each die comprises a peripheral region defining a street that surrounds the array configuration. The method forms a plurality of tabs that join one die to another die in the street of the substrate. Each of the tabs also is separated from each other in a sequential manner by a recessed region between at least two of the tabs. The street defined by the tabs and the recessed region defined therebetween in a sequential manner.

20 Claims, 7 Drawing Sheets

METHOD FOR FABRICATING IMPROVED MIRROR ARRAYS FOR PHYSICAL SEPARATION

BACKGROUND OF THE INVENTION

This invention generally relates to techniques for fabricating an object. More particularly, the present invention provides a method for fabricating a switch fabric using a high intensity light source. Merely by way of example, the present invention is implemented using such high intensity light source for separating arrays of mirrors on dice from a substrate structure, but it would be recognized that the invention has a much broader range of applicability. The arrays of mirrors can be used in a switching device for long haul communications. The invention can be applied to other types of networks including local area networks, enterprise networks, small switch designs (e.g., two by two) and the like.

As the need for faster communication networks becomes more desirable, digital telephone has progressed. Conventionally, standard analog voice telephone signals have been converted into digital signals. These signals can be 24,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode fiber optics have also been used at much higher speeds of data transfer. Here, optical switching networks have also been improved. An example of such optical switching standard is called the Synchronous Optical Network (SONET), which is a packet switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices require the need to convert optical signals from a first source into electric signals for switching such optical signals over a communication network. Once the electric signals have been switched, they are converted back into optical signals for transmission over the network. As merely an example, a product called the SN 16000 is BroadLeaf™ Network Operating System (NOS) made by Sycamore Networks, Inc. uses such electrical switching technique. Numerous limitations exist with such conventional electrical switching technique. For example, such electrical switching often requires a lot of complex electronic devices, which make the device difficult to scale. Additionally, such electronic devices become prone to failure, thereby influencing a reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale for switching a high number of signals from a bundle of optical fibers, which may be desirable today. Other companies have also been attempting to develop technologies for switching such high number of signals, but have been unsuccessful. Such switches are also difficult to manufacture effectively and reliably. Other examples of optical switching networks include access, metropolitan and Dense Wavelength Division Multiplexing (DWDM) networks.

As merely an example, some companies have been attempting to use mirrors to switch an optical beam from one fiber to another. The use of mirrors in telecommunication signals has some advantages such as low signal loss and the like. Such mirrors, however, are often difficult to manufacture in a high density mirror array. In particular, such mirrors are often fragile and prone to damage during fabrication. U.S. Pat. No. 5,969,465, assigned to XROS, Inc. describes such a mirror, which is often difficult to make to form high density array structures. Accordingly, there needs to be improved ways of manufacturing such mirrors before large density arrays of such mirrors can be made effectively and cost efficiently.

From the above, it is seen that an improved way for fabricating a mirror array for switching a plurality of optical signal is highly desirable.

SUMMARY OF THE INVENTION

According to the present invention, a technique including a method and apparatus for fabricating an object such as a switch fabric is provided. More particularly, the present invention provides a method for fabricating a switch fabric using a high intensity light source. Merely by way of example, the present invention is implemented using such high intensity light source for separating arrays of mirrors on dice from a substrate structure, but it would be recognized that the invention has a much broader range of applicability. The arrays of mirrors can be used in a switching device for long haul communications. The invention can be applied to other types of networks including local area networks, enterprise networks, small switch designs (e.g., two by two) and the like.

In a specific embodiment, the present invention provides a method for fabricating an array of mirrors disposed on a die from a substrate. The method includes placing a substrate comprising a plurality of die thereon on a stage. Each of the die comprises a plurality of movable mirror devices (or to be movable mirror devices) in an array configuration. Each die comprises a peripheral region defining a street that surrounds the array configuration. The method forms a plurality of tabs that join one die to another die in the street of the substrate. Each of the tabs also is separated from each other in a sequential manner by a recessed region between at least two of the tabs. The street defined by the tabs and the recessed region defined there between in a sequential manner. The method then directs a beam of high intensity electromagnetic radiation at the street between the one die and the other die to ablate each of the tabs that joins the one die to the other die to separate the one die from the other die to free the die comprising the mirror array from the other dice on the substrate.

Many benefits are achieved by way of the present invention over conventional techniques. For example, the present technique provides an easy to use process that relies upon conventional technology. The technique also can be reduce time for manufacture of the array of mirror from a die, which is one of many die on a substrate. Furthermore, the technique creates almost no damage to movable mirror devices, which are prone to mechanical, electrical, chemical, and thermal damage. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, a technique including a method and apparatus for fabricating an object such as a switch fabric is provided. More particularly, the present invention provides a method for fabricating a switch fabric using a high intensity light source. Merely by way of example, the present invention is implemented using such high intensity light source for separating arrays of mirrors on dice from a substrate structure, but it would be recognized that the invention has a much broader range of applicability. The arrays of mirrors can be used in a switching device for long haul communications. The invention can be applied to other types of networks including local area networks, enterprise networks, small switch designs (e.g., two by two) and the like.

Figure 1:
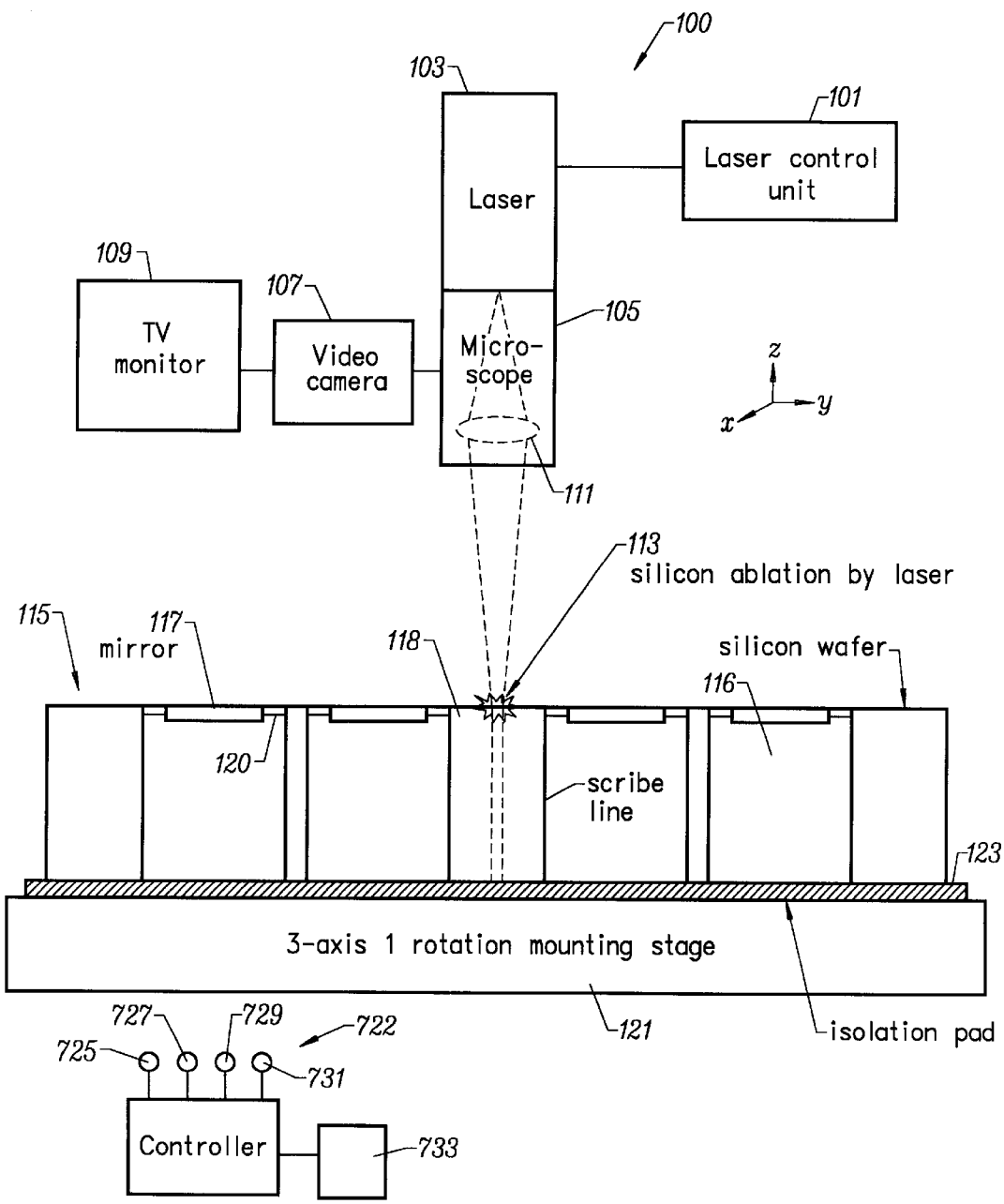
FIG. 1 is a simplified diagram of an apparatus according to an embodiment of the present invention.

FIG. 1 is a simplified diagram of an apparatus 100 according to an embodiment of the present invention. This diagram is merely an example, which should not unduly limit the scope of the claims herein. One of ordinary skill in the art would recognize many other variations, modifications, and alternatives. As shown, the apparatus includes a variety of elements such as a laser source 103, which is coupled to a laser control unit 101. The laser source provides a laser beam that focuses through a microscope 105. The beam focuses through lens 111, which may be a single or multiple lenses. To capture an image of a field of view, the apparatus also has a video camera 107 coupled to a display 109, which can be a television monitor or the like. The apparatus can also include other features.

As merely an example, the apparatus can be any suitable laser cutting source. The apparatus preferably has an Nd:YAG laser source, which is capable of providing a high intensity beam of energy. In some embodiments, the Nd:YAG uses a green laser source (i.e., 532 nanometer) for silicon materials, but can be others, e.g., aluminum, ITO, chrome, nickel chrome, titanium tungsten, copper, gold, silicon nitride, silicon dioxide, polysilicon, single crystal silicon, amorphous silicon. The apparatus can be others as well. The beam size can be adjustable and can form a spot size of less than 50 micrometers but is preferably less than 40 micrometers and less, but can be others. The apparatus can be one made by a company called New Wave Research of Fremont, Calif., such as the Quiklaze II™ product. The laser is often coupled to a microscope for adjusting and focusing the beam. An example of such a scope is the Mitutoyo FS60 microscope, but can be others.

The laser source and beam can be on a stage that is adjustable in all spatial dimensions, but can be selective. For example, the laser stage includes an adjustment in an x-direction, a y-direction, and a z-direction. Alternatively, the stage includes an adjustment in cylindrical or spherical coordinates. The stage can be moved in a continuous manner. Alternatively, the stage can be stepped. The stage has a tolerance of 1 micrometer or better in the x and y directions. The stage has a tolerance of 1 micrometer or better in the z-direction. The stage can be driven in an automatic mode, which is programmable using the controller. Alternatively, the stage can be driven in a manual mode. Alternatively, the stage can be driven using a combination of automatic and manual modes. Of course depending upon the application, the stage can be made using suitable features without departing from the scope of the claims herein.

The apparatus provides a beam to separate a die 116 from other dice on a substrate 115. Each die has a plurality of movable mirrors 117. Each of the movable mirrors is fragile and prone to mechanical damage. Each of the movable mirrors may include torsion bars 120, which are used to support and drive the mirrors. Each of the mirrors would possibly be prone to damage if each die was removed using mechanical cutting devices, such as scribes, saws, or a combination of such scribe and saw. A street region 118 separates one die from another die. Other examples of such a mirror is described in U.S. Pat. No. 4,317,611 assigned to International Business Machines Corporation, Armonk, N.Y., and in the name of Petersen.

The substrate rests on stage or holder 121. A protective material 123 is sandwiched between the bottom of the substrate and holder surface. The protective material can be made of a suitable material that sinks thermal energy and protects the substrate from excess heat, which may deform and cause defects in the mirror. The protective material can include thermal conductive characteristics, which sink any excess thermal energy in the form of heat to the holder. Additionally, the protective material can include reflective characteristics, such that the beam does not cut into the holder. Here, the protective material can be made of a suitable material such as a polymer based fabric that is continuous or woven in some embodiments. The fabric is preferably woven and has good particle characteristics. For example, the fabric should be substantially free from particles and is preferably compatible for ISO Class 6 & 7 (1,000 & 10,000/M4.5 & M5.5) Cleanroom Applications, but can be others. Of course, the type of material used depends highly upon the application.

The holder can be on a suitable stage for moving the substrate in all spatial dimensions, but can also be selective. For example, the stage includes an adjustment in an x-direction, a y-direction, and a z-direction. Alternatively, the stage includes an adjustment in cylindrical or spherical coordinates. The stage can be moved in a continuous manner. Alternatively, the stage can be stepped. The stage has a tolerance of 1 micron or better in the x and y directions. The stage has a tolerance of 1 micron or better in the z-direction. The stage can be driven in an automatic mode, which is programmable using the controller. Alternatively, the stage can be driven in a manual mode. Alternatively, the stage can be driven using a combination of automatic and manual modes. Of course depending upon the application and stage can be made using suitable features without departing from the scope of the claims herein.

Also shown is a controller 722. The controller is coupled to one or more of the hardware and/or software elements described above as well as others. The controller can be any suitable microprocessor based unit that is capable of programming, monitoring, and driving hardware and/or software elements. The controller has a plurality of inputs/outputs (I/Os), which are shown by reference numerals 725, 727, 729, and 731. The I/Os can couple to control and operate the stage 721. Additionally, the I/Os can couple to the laser control unit to control and operate the laser control unit. The I/Os can couple to the display as well to control and operate the display. The controller also couples to other features of the apparatus. Furthermore, the controller has memory 733, which has computer codes for carrying out any of the functionality described herein as well as others. Of course, the type and configuration of the controller depends highly upon the application.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

Figure 2:
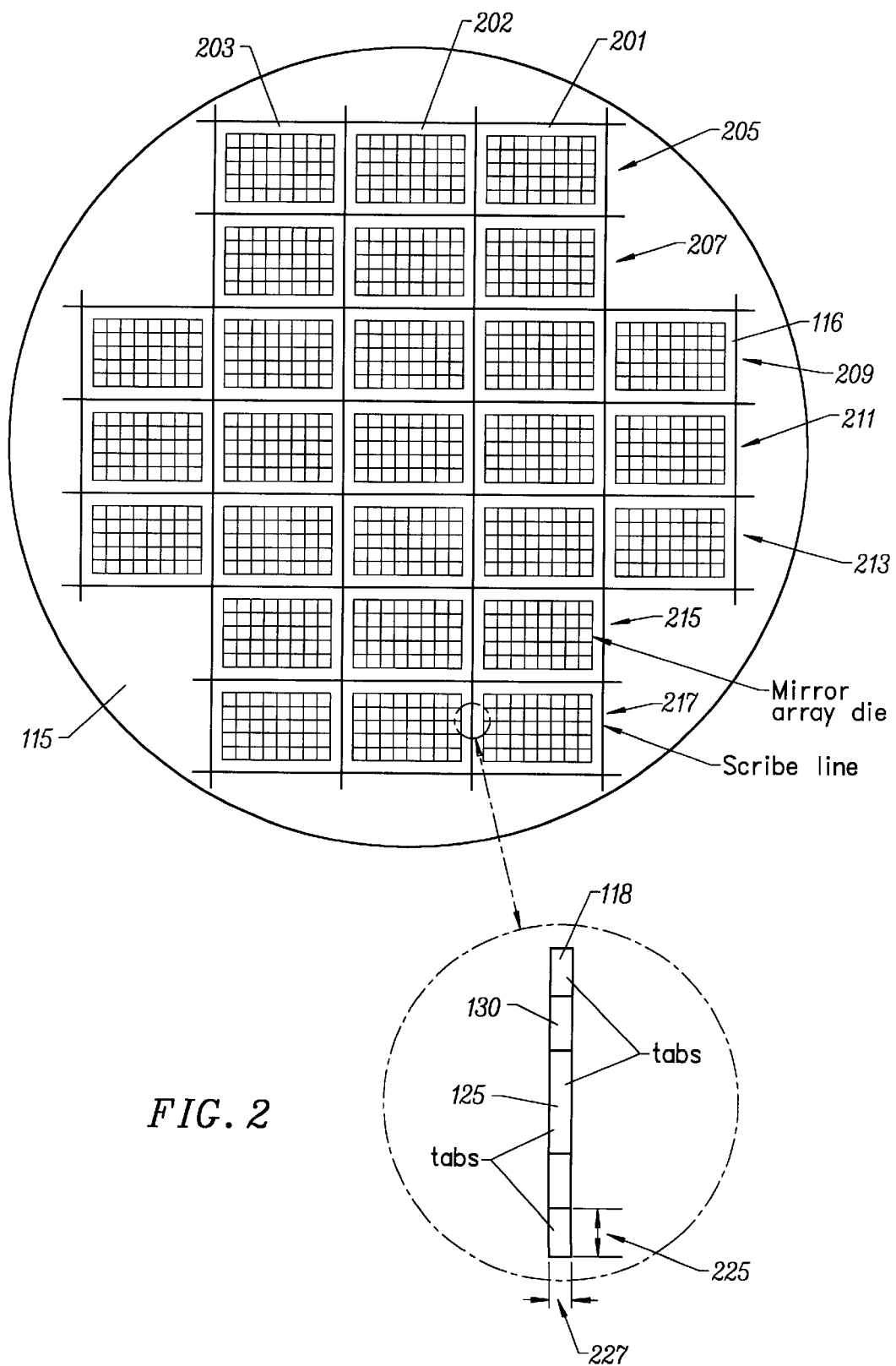
FIG. 2 is a simplified diagram of a substrate according to an embodiment of the present invention.

As noted above, the substrate includes a plurality of die, which has a plurality of defection or mirror devices thereon. Each of the mirror devices is high fragile and prone to damage. The laser beam is operated in a manner to substantially prevent mechanical damage to any of the die and mirrors. Additionally, the beam is operated to prevent thermal damage to any of the die and the mirrors. As merely an example, FIG. 2 shows a simplified diagram of a substrate 115 according to an embodiment of the present invention. This diagram is merely an example, which should not unduly limit the scope of the claims herein. One of ordinary skill in the art would recognizes many other variations, modifications, and alternatives. Like reference numerals are used in this Fig. and the other Figs. described herein for referencing purposes only, but are not intended to be limiting the scope of the claims herein.

As shown, the substrate 115 has a plurality of die 116. Each of the die is arranged to each other in an array like configuration. That is, each of the die is lined up in rows and columns, which are separated from each other with streets 118. For example, the substrate includes columns of die 201, 202, and 203. The substrate also includes rows 205, 207, 209, 211, 213, 215, and 217, which forms an N by M matrix of die. Each die has a plurality of mirrors, as noted. In a specific embodiment, each of the movable mirrors is fragile and prone to mechanical damage. Each of the movable mirrors may include torsion bars, which are used to support and drive the mirrors. Each of the mirrors would possibly be prone to damage if each die was removed using mechanical cutting devices, such as scribes, saws, or a combination of such scribe and saw. Other examples of such a mirror is described in U.S. Pat. No. 4,317,611 assigned to International Business Machines Corporation, Armonk, N.Y., and in the name of Petersen.

The street region 118 separates one die from another die. The street can be an exposed portion of substrate, which is often made of silicon. The street can also be an etched portion of the substrate, where the street is actually a recessed region or a trench like structure. Here, the recessed region can be made by a variety of techniques such as plasma etching, reactive ion etching, deep reactive ion etching or ion milling, or other techniques, including wet etching. The street is often reduced in thickness relative to the entire structure to facilitate separation of each of the die from each other in an efficient manner.

Preferably, the street includes a plurality of tab connectors 125 and openings 130. The tab connectors are often material regions of silicon, which have not been removed. The openings are recessed regions, which extend along the entire thickness of the substrate to form a complete opening through the substrate or an opening that includes a bottom region (e.g., non-complete opening), which is easily ablated using the beam, for example. As merely an example, each of the tab connectors has a thickness of at least 100 microns to support one die to the other die in the substrate structure. Additionally, each tab connector also has a width 227 of about 60 microns and less (or can be greater) for ablation purposes in some embodiments. Each tab connector can also include a length 225 of about 300 microns and less or greater, but can be at other dimensions. In some embodiments, the tab connector can have a different thickness, width, and length, or a combination of these, depending upon the application. Details of separating one die from another die are provided throughout the present specification, and more particularly below.

Figure 2A:
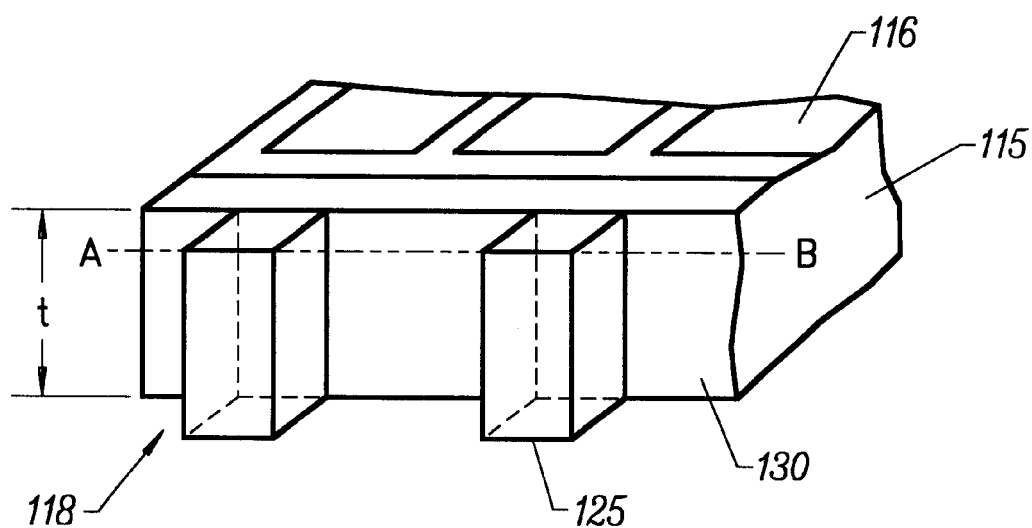
FIGS. 2A, 2B, 2C, and 2D are simplified diagrams of tab connector structures according to embodiments of the present invention.

FIGS. 2A, 2B, 2C, and 2D are simplified diagrams of tab connector structures according to embodiments of the present invention. These diagrams are merely examples that should not unduly limit the scope of the claims herein. One of ordinary skill in the art would recognize many other variations, modifications, and alternatives. Like reference numerals are used in these Figs. as the others described herein for cross-reference purposes only without unduly limiting the scope of the claims herein. As shown is a simplified cross-sectional view diagram of the street region 118 including the tab connector 125. The cross-section illustrates the region identified between reference letter A and reference letter B in FIG. 2. Also shown are dice 116, which includes a plurality of movable mirrors (not shown). The dice are fabricated on substrate 115. The diagram of FIG. 2A illustrates opening regions 130, which run along an entire thickness t of the substrate. Each of the tabs 125 also runs along the thickness of the substrate. Each of the tabs is made using conventional masking and etching techniques, such as deep reactive ion etching. Details of the masking and etching process are described below.

Figure 2B:
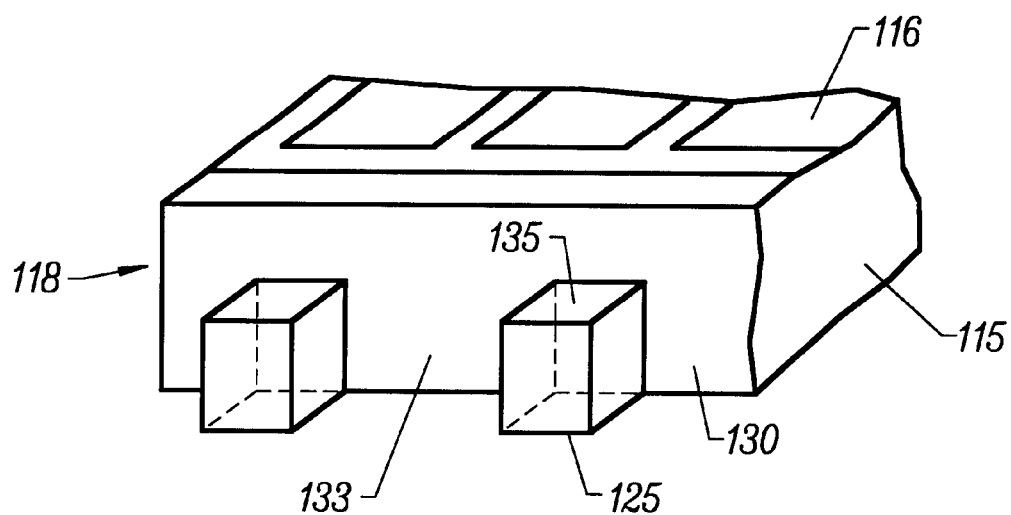

In an alternative embodiment, FIG. 2B shows a plurality of recessed tabs, which couple each die to each other. The recessed tabs are made using multiple masking and etching processes. For example, the processes include forming a photo mask layer overlying the entire substrate while exposing the streets. The streets are etched to form trenches 113. Next, portions 135 of the streets are masked and remaining portions of the streets are etched to form openings 130 and tabs 125. In the present embodiment, the tab includes a thickness that is less than the thickness of the substrate. Details of the masking and etching process are described below.

Figure 2C:
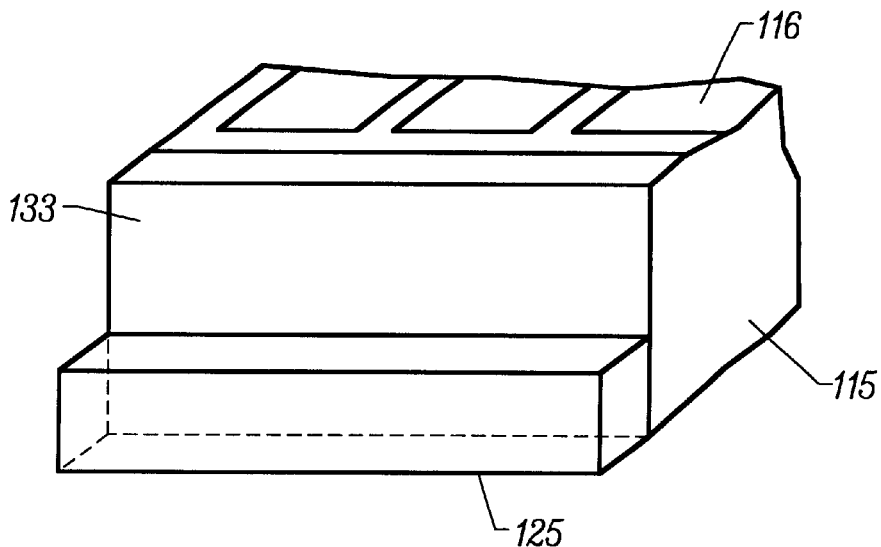

In still a further embodiment, FIG. 2C shows a continuous recessed tab, which couples each die to each other. The recessed tab is made using at least one masking and etching process. For example, the processes include forming a photo mask layer overlying the entire substrate while exposing the streets. Here, masking is performed overlying an upper surface of the substrate. The streets are etched to form trenches 133, which do not extend through the entire thickness of the substrate. In the present embodiment, the tab includes a thickness that is less than the thickness of the substrate. Details of the masking and etching process are described below.

Figure 2D:
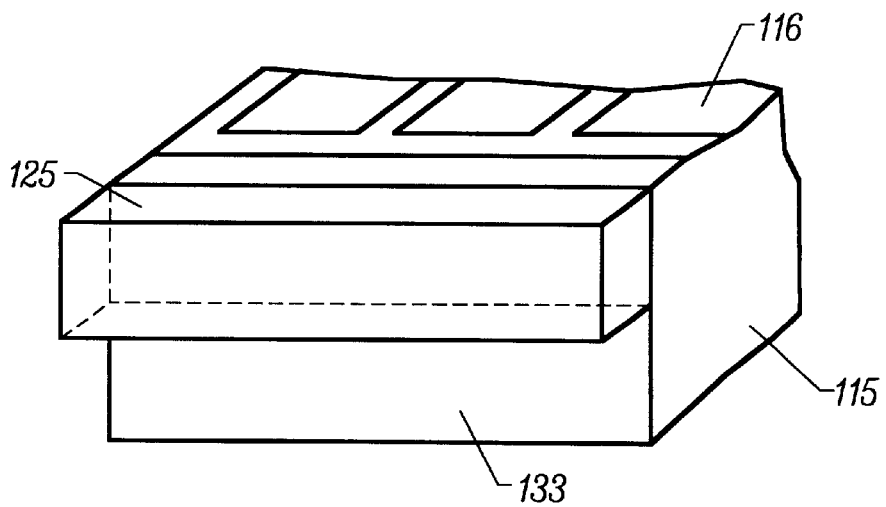

In an alternative embodiment, FIG. 2D shows a continuous recessed tab, which couples each die to each other. The recessed tab is made using at least one masking and etching process. For example, the processes include forming a photo mask layer overlying the entire substrate while exposing the streets. Here, masking is performed overlying a lower surface of the substrate. The streets are etched to form trenches 133, which do not extend through the entire thickness of the substrate. In the present embodiment, the tab includes a thickness that is less than the thickness of the substrate. Details of the masking and etching process are described below.

A method for fabricating a tab connector onto an integrated mirror array is provided as follows:
 1. Provide silicon on insulator substrate;
 2. Form mirror structures on the substrate;
 3. Apply photoresist overlying substrate structure to expose streets;
 4. Etch streets to form trench regions to define tab connector structures (preferably etch streets at the same step as etching mirror structures, each of which extend down to the insulator structure of the silicon on insulator substrate;
 5. Strip resist;
 6. Release mirror structures to form movable mirrors;
 7. Perform other steps as desired.

The above sequence of steps provides a way to form tab connector structures to facilitate separation of one die from another die. The tab connector has less material region to be ablated during separation. By way of less material, the steps can be used to separate one die from another die in a timely and efficient manner. Additionally, the steps provide less thermal and mechanical damage to the mirror arrays. These and other details of the invention are provided below.

Figure 2E:
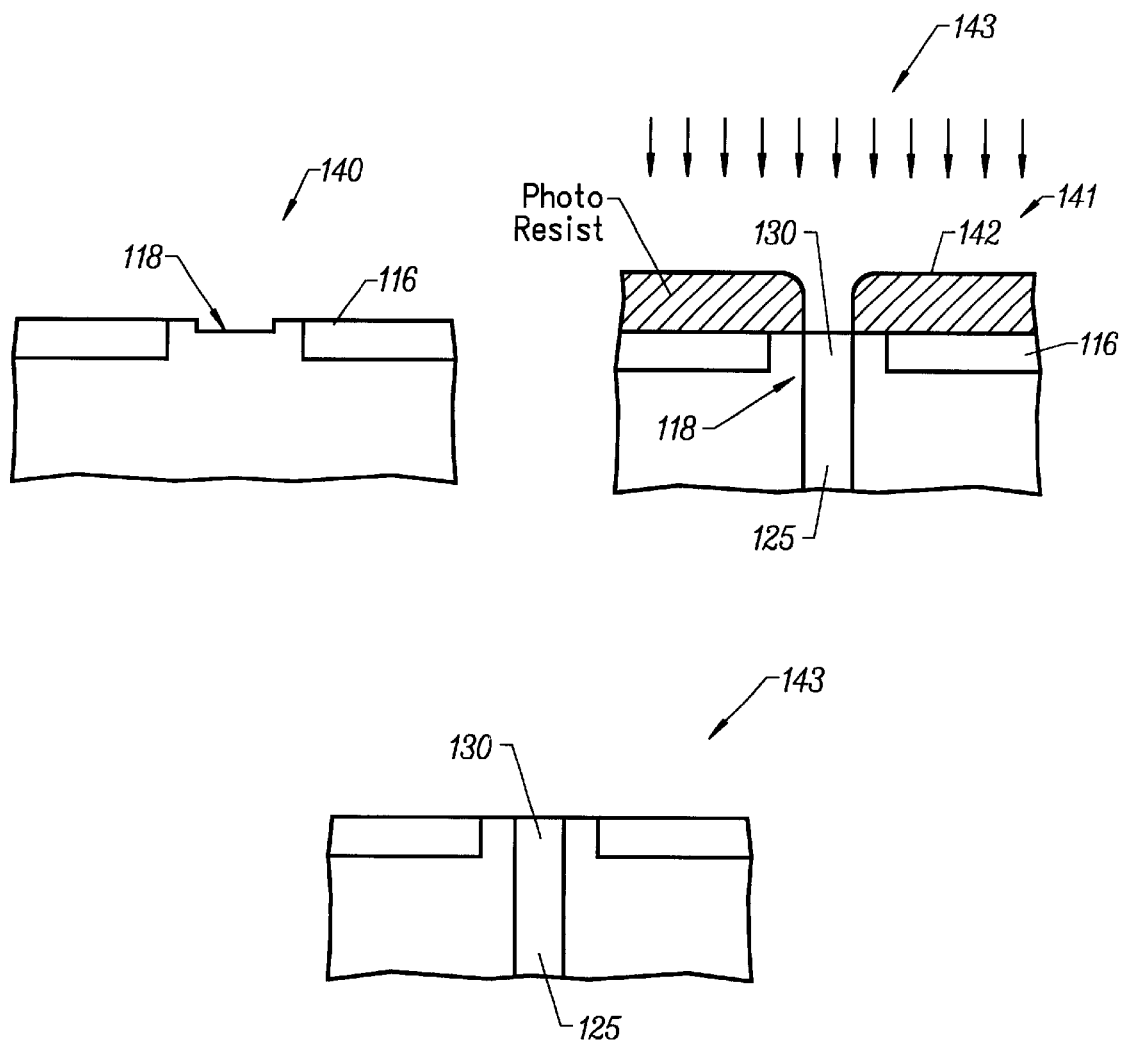
FIG. 2E is illustrates a method of forming a tab connector according to an embodiment of the present invention.

FIG. 2E is illustrates a method of forming a tab connector according to an embodiment of the present invention. This method is merely an illustrate that should not unduly limit the scope of the claims herein. One of ordinary skill in the art would recognize many other variations, modifications, and alternatives. As shown, the method begins by providing a substrate 140. The substrate includes a plurality of die, which has a plurality of defection or mirror devices thereon. Each of the mirror devices is highly fragile and prone to damage. Each of the die is arranged to each other in an array like configuration. That is, each of the die is lined up in rows and columns, which are separated from each other with streets 118. Each die has a plurality of mirrors, as noted. In a specific embodiment, each of the movable mirrors is fragile and prone to mechanical damage. Each of the movable mirrors may include torsion bars, which are used to support and drive the mirrors. Each of the mirrors would possibly be prone to damage if each die was removed using mechanical cutting devices, such as scribes, saws, or a combination of such scribe and saw. Other examples of such a mirror is described in U.S. Pat. No. 4,317,611 assigned to International Business Machines Corporation, Armonk, N.Y., and in the name of Petersen.

A masking layer 142 is applied overlying the substrate. The masking layer has an opening to expose street region 118. The street region is exposed to an etching process. Preferably, the etching process is an ion milling or deep reactive ion etching process 143. The method forms a substantially anisotropic etch which is achieved using a polymer coating of sidewalls of the etched surfaces, controlling a chemical reaction in the lateral etchant, and others. The method should be able to achieve high aspect ratios. The etching process for silicon removes at least 100 microns of silicon material thickness to form openings 130 and tabs 125. Depending upon the embodiment, the tab can have a thickness of the substrate. The tab can also have a thickness less than the thickness of the substrate. The tab can include openings or can be recessed along an entire length of the street. These and other variations are described above as well as throughout the present specification. Once etching has been completed, the method removes the resist by way of a stripping process to form completed substrate structure 143. A patent application U.S. Ser. No. 09/780,846 titled "Device for Improved Connection Structures for Array Mirror Devices," commonly assigned, and hereby incorporated by reference for all purposes, describes and claims such a tab connector for an arrayed mirror substrate structure. Details of separating one die from another die are provided throughout the present specification, and more particularly below.

Preferably, the method defines the mirror structure and the tabs during the same step. That is, the mirror structure and tabs are defined on a silicon layer formed on an insulator layer, which forms overlying a substrate. Here, the method etchings the street regions at the same time as defining the mirror structure, where an overlying mask layer (e.g., photoresist, etch resistant layer). The street region is etched to form the tab regions and the mirror structure is etched to define each of the mirrors, including torsion bars, if any. Of course, the specific process sequence depends upon the application.

Although the above has been described in terms of specific hardware features and/or processing steps, it would be recognized that there can be many alternatives, variations, and modifications. For example, any of the above elements can be separated or combined. Alternatively, some of the elements can be implemented using other process steps implemented by, for example, computer software or a combination of hardware and software. Alternatively, the above elements can be further integrated independently or with other process steps, which are performed using hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

A method according to an embodiment of the present invention may be outlined below:
 1. Provide silicon wafer comprising a plurality of die, each die including a plurality of mirrors;
 2. Place silicon wafer on stage, which is movable in selected spatial dimensions;
 3. Hold silicon wafer to stage;
 4. Align wafer to laser beam apparatus;
 5. Target laser beam to tab on a street;
 6. Direct beam to tab on the street;
 7. Ablate tab on the street using the beam;
 8. Align wafer to target the next tab on the street;
 9. Direct beam to the next tab on the street;

10. Ablate tab on the street using the beam;
11. Repeat steps of directing the beam to the next tab and ablating the tab;
12. Continue to repeat until one (or more) of the die has been separated from the substrate.

The above steps show a way of separating one die from another die that causes little or no damage to the array of mirrors. As shown, the above steps use a laser beam to ablate a tab that is used to connect one die from another die. The present method is efficient and can be implemented using conventional technologies. Additionally, the method is more timely since it only ablates tabs of substrate structure, which is a lot less in material that a complete street structure without such tabs. These and other benefits and details of the invention are provided below in reference to the Figs.

Figure 3:
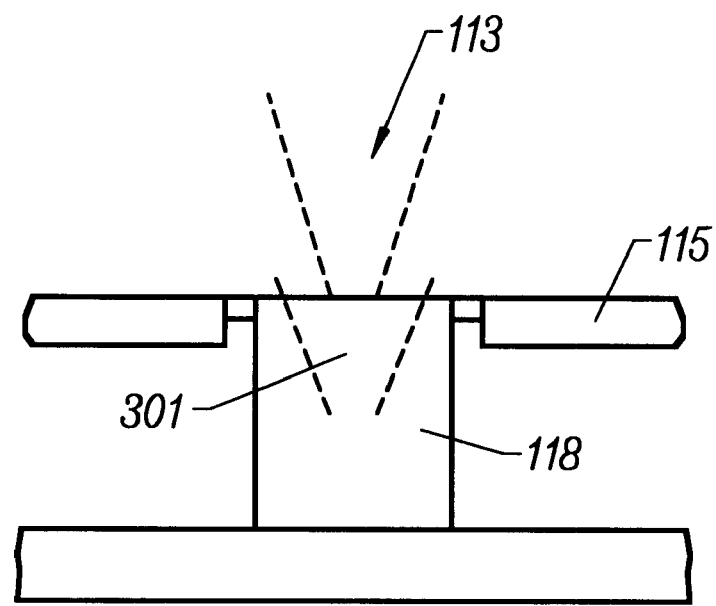
FIGS. 3–4 are simplified diagrams illustrating methods for fabricating an optical deflection device according to embodiments of the present invention.
Figure 4:
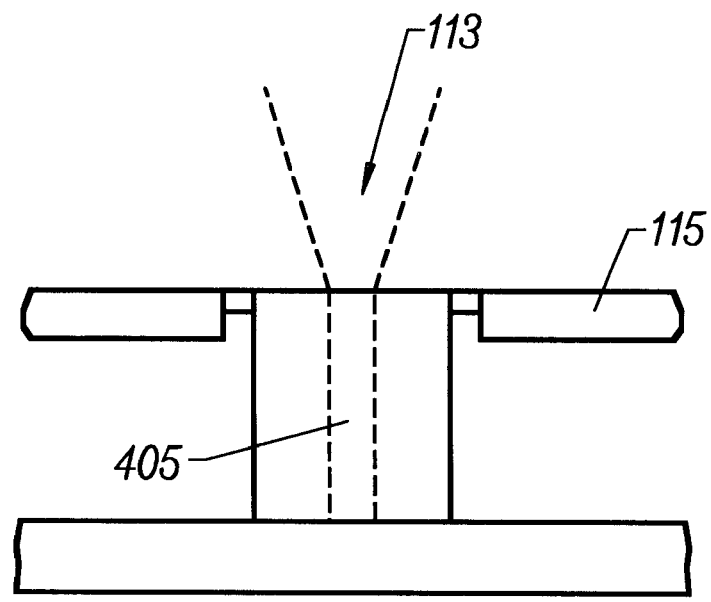
Figure 5:
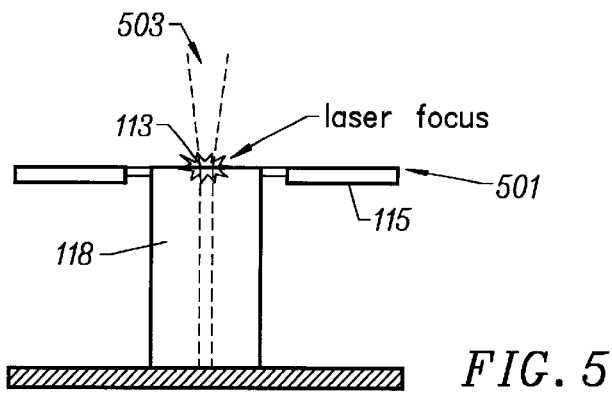
FIGS. 5–8 are simplified diagrams illustrating methods for fabricating an optical deflection device according to embodiments of the present invention.
Figure 6:
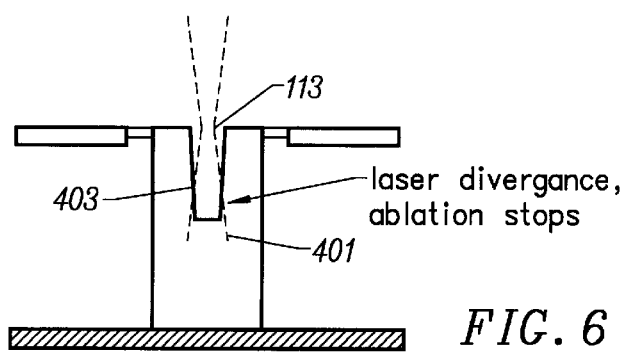

FIGS. 3–4 are simplified diagrams illustrating methods for fabricating an optical deflection device according to embodiments of the present invention. These diagrams are merely examples, which should not unduly limit the scope of the claims herein. One of ordinary skill in the art would recognizes many other variations, modifications, and alternatives. Like reference numerals are used in this Fig. and the other Figs. described herein for referencing purposes only, but are not intended to be limiting the scope of the claims herein. As shown, the method provides a silicon wafer comprising a plurality of die, where each die includes a plurality of mirrors.

As noted, the substrate has a plurality of die and is arranged to each other in an array like configuration. That is, each of the die is lined up in rows and columns, which are separated from each other with streets. For example, the substrate includes columns of die and also includes rows, which form an N by M matrix of die. Each die has a plurality of mirrors, as noted. In a specific embodiment, each of the movable mirrors is fragile and prone to mechanical damage. Each of the movable mirrors may include torsion bars, which are used to support and drive the mirrors. Each of the mirrors would possibly be prone to damage if each die was removed using mechanical cutting devices, such as scribes, saws, or a combination of such scribe and saw. Other examples of such a mirror is described in U.S. Pat. No. 4,317,611 assigned to International Business Machines Corporation, Armonk, N.Y., and in the name of Petersen.

The method places the silicon wafer on stage, which is movable in selected spatial dimensions. The method then holds the silicon wafer to stage. The wafer is aligned to the laser beam apparatus. As merely an example, the apparatus can be any suitable laser cutting source. The apparatus preferably has an Nd:YAG laser source, which is capable of providing a high intensity beam of energy. In some embodiments, the Nd:YAG uses a green laser source (i.e., 532 nanometer) for silicon materials, but can be others, e.g., aluminum, ITO, chrome, nickel chrome, titanium tungsten, copper, gold, silicon nitride, silicon dioxide, polysilicon, single crystal silicon, amorphous silicon. The apparatus can be others as well. The beam size can be adjustable and can form a spot size of less than 50 micrometers but is preferably less than 40 micrometers and less, but can be others. The apparatus can be one made by a company called New Wave Research of Fremont, Calif., such as the Quiklaze II™ product. The laser is often coupled to a microscope for adjusting and focusing the beam. An example of such a scope is the Mitutoyo FS60 microscope, but can be others.

The laser source and beam can be on a stage that is adjustable in all spatial dimensions, but can be selective. For example, the laser stage includes an adjustment in an x-direction, a y-direction, and a z-direction. Alternatively, the stage includes an adjustment in cylindrical or spherical coordinates. The stage can be moved in a continuous manner. Alternatively, the stage can be stepped. The stage has a tolerance of 1 micron in the x and y directions. The stage has a tolerance of micron in the z-direction. The stage can be driven in an automatic mode, which is programmable using the controller. Alternatively, the stage can be driven in a manual mode. Alternatively, the stage can be driven using a combination of automatic and manual modes. Of course depending upon the application and stage can be made using suitable features without departing from the scope of the claims herein.

The substrate rests on holder. A protective material is sandwiched between the bottom of the substrate and holder surface. The protective material can be made of a suitable material that sinks thermal energy and protects the substrate from excess heat, which may deform and cause defects in the mirror. The protective material can be made of a suitable material that sinks thermal energy and protects the substrate from excess heat, which may deform and cause defects in the mirror. The protective material can include thermal conductive characteristics, which sink any excess thermal energy in the form of heat to the holder. Additionally, the protective material can include reflective characteristics, such that the beam does not cut into the holder. Here, the protective material can be made of a suitable material such as a polymer based fabric that is continuous or woven in some embodiments. The fabric is preferably woven and has good particle characteristics. For example, the fabric should be substantially free from particles and is preferably compatible for ISO Class 6 & 7 (1,000 & 10,000/M4.5 & M5.5) Cleanroom Applications, but can be others. Of course, the type of material used depends highly upon the application.

The holder can be on a suitable stage for moving the substrate in all spatial dimensions. For example, the stage includes an adjustment in an x-direction, a y direction, and a z-direction. Alternatively, the stage includes an adjustment in cylindrical or spherical coordinates. The stage can be moved in a continuous manner. Alternatively, the stage can be stepped. The stage has a tolerance of 1 micron or better in the x and y directions. The stage has a tolerance of 1 micron or better in the z-direction. The stage can be driven in an automatic mode, which is programmable using the controller. Alternatively, the stage can be driven in a manual mode. Alternatively, the stage can be driven using a combination of automatic and manual modes. Of course depending upon the application and stage can be made using suitable features without departing from the scope of the claims herein.

Next, the beam is targeted to a tab on a street. As shown, beam 113 is directed to the tab on the street. Preferably, the beam is focused at the surface of the tab or at a point 301 underlying the surface to ablate the entire tab using a single focus point, but is not required by the present method. The method ablates the tab on the street using the beam to separate one die from another die, as shown by reference numeral 405. Next, the method aligns wafer to target the next tab on the street. The method directs the beam to the next tab on the street; and ablates the tab on the street using the beam. The method repeats the steps of directing the beam to the next tab and ablating the tab. The method continues to repeat until one (or more) of the die has been separated from the substrate.

The method above is illustrated in a specific sequence of steps. Such sequence of steps may be performed alone or in combination with others, which are described or not even described. The steps can be performed in the order shown or in other orders, if desired. The steps also can be performed using a combination of hardware and software. The steps also can be performed using hardware. It is also understood that the examples and embodiments described herein are for illustrative purposes only and that various modifications or changes in light thereof will be suggested to persons skilled in the art and are to be included within the spirit and purview of this application and scope of the appended claims.

A method according to an alternative embodiment of the present invention may be outlined below:

1. Provide silicon wafer comprising a plurality of die, each die including a plurality of mirrors;
2. Place silicon wafer on stage, which is movable in selected spatial dimensions;
3. Hold silicon wafer to stage;
4. Align wafer to laser beam apparatus;
5. Target laser beam to tab on a street between a first die and a second die;
6. Focus beam to first focus region on the tab;
7. Direct beam to tab at the first focus region on the street;
8. Ablate a first portion of the tab on the street using the beam;
9. Focus beam to second focus region on the tab;
10. Direct beam to tab at the second focus region of the tab;
11. Ablate a second portion of the tab on the street using the beam to completely separate the first die from the second die at the tab;
12. Align wafer to target the next tab on the street;
13. Repeat multiple ablation process noted above;
14. Repeat multiple ablation process for the next tab to ablate it; and
15. Continue to repeat one or more of the above steps until one (or more) of the die has been separated from the substrate.

The above steps show a way of separating one die from another die that causes little or no damage to the array of mirrors. As shown, the above steps use a laser beam to ablate a tab that is used to connect one die from another die. The method relies upon targeting the beam at more than one focus region to ablate a tab, which may be of a sufficient thickness that it is difficult to remove it one a single focus region of the beam. The present method is efficient and can be implemented using conventional technologies. Additionally, the method is more timely since it only ablates tabs of substrate structure, which is a lot less in material that a complete street structure without such tabs. These and other benefits and details of the invention are provided below in reference to the Figs.

FIGS. 5–8 are simplified diagrams illustrating methods for fabricating an optical deflection device according to embodiments of the present invention. These diagrams are merely examples, which should not unduly limit the scope of the claims herein. One of ordinary skill in the art would recognizes many other variations, modifications, and alternatives. Like reference numerals are used in this FIG. and the other Figs. described herein for referencing purposes only, but are not intended to be limiting the scope of the claims herein. As shown, the method provides a silicon wafer comprising a plurality of die, where each die includes a plurality of mirrors.

As noted, the substrate has a plurality of die and is arranged to each other in an array like configuration. That is, each of the die is lined up in rows and columns, which are separated from each other with streets. For example, the substrate includes columns of die and also includes rows, which form an N by M matrix of die. Each die has a plurality of mirrors, as noted. In a specific embodiment, each of the movable mirrors is fragile and prone to mechanical damage. Each of the movable mirrors may include torsion bars, which are used to support and drive the mirrors. Each of the mirrors would possibly be prone to damage if each die was removed using mechanical cutting devices, such as scribes, saws, or a combination of such scribe and saw. Other examples of such a mirror is described in U.S. Pat. No. 4,317,611 assigned to International Business Machines Corporation, Armonk, N.Y., and in the name of Petersen.

The method places the silicon wafer on stage, which is movable in selected spatial dimensions. The method then holds the silicon wafer to stage. The wafer is aligned to the laser beam apparatus. As merely an example, the apparatus can be any suitable laser cutting source. The apparatus preferably has an Nd:YAG laser source, which is capable of providing a high intensity beam of energy. In some embodiments, the Nd:YAG uses a green laser source (i.e., 532 nanometer) for silicon materials, but can be others, e.g., aluminum, ITO, chrome, nickel chrome, titanium tungsten, copper, gold, silicon nitride, silicon dioxide, polysilicon, single crystal silicon, amorphous silicon. The apparatus can be others as well. The beam size can be adjustable and can form a spot size of less than 50 micrometers but is preferably less than 40 micrometers and less, but can be others. The apparatus can be one made by a company called New Wave Research of Fremont, Calif., such as the Quiklaze II™ product. The laser is often coupled to a microscope for adjusting and focusing the beam. An example of such a scope is the Mitutoyo FS60 microscope, but can be others.

The laser source and beam can be on a stage that is adjustable in all spatial dimensions. For example, the laser stage includes an adjustment in an x-direction, a y-direction, and a z-direction. Alternatively, the stage includes an adjustment in cylindrical or spherical coordinates. The stage can be moved in a continuous manner. Alternatively, the stage can be stepped. The stage has a tolerance of 1 micron in the x and y directions. The stage has a tolerance of 1 micron in the z-direction. The stage can be driven in an automatic mode, which is programmable using the controller. Alternatively, the stage can be driven in a manual mode. Alternatively, the stage can be driven using a combination of automatic and manual modes. Of course depending upon the application and stage can be made using suitable features without departing from the scope of the claims herein.

The substrate rests on holder. A protective material is sandwiched between the bottom of the substrate and holder surface. The protective material can be made of a suitable material that sinks thermal energy and protects the substrate from excess heat, which may deform and cause defects in the mirror. The protective material can include thermal conductive characteristics, which sink any excess thermal energy in the form of heat to the holder. Additionally, the protective material can include reflective characteristics, such that the beam does not cut into the holder. Here, the protective material can be made of a suitable material such as the one that was described above but can be others. Of course, the type of material used depends highly upon the application.

The holder can be on a suitable stage for moving the substrate in all spatial dimensions. For example, the stage includes an adjustment in an x-direction, a y-direction, and a z-direction. Alternatively, the stage includes an adjustment in cylindrical or spherical coordinates. The stage can be moved in a continuous manner. Alternatively, the stage can be stepped. The stage has a tolerance of 1 micron or better in the x and y directions. The stage has a tolerance of 1 micron or better in the z-direction. The stage can be driven in an automatic mode, which is programmable using the controller. Alternatively, the stage can be driven in a manual mode. Alternatively, the stage can be driven using a combination of automatic and manual modes. Of course depending upon the application and stage can be made using suitable features without departing from the scope of the claims herein.

Next, the beam is targeted to a first focus region on a tab on a street. As shown, beam 113 is directed to the first focus region on the tab on the street. The first focus region is defined by reference numeral 501. The first focus region receives a focused beam from a converging 503 source and focuses it via optical lens, which is coupled to the beam. Once the beam impinges on the scribe line and in particular the tab, the beam ablates the tab, which is silicon. The ablation occurs until an opening or trench is formed 403. As the beam ablates, the beam diverges and becomes weaker, where it has difficulty in any further removal of silicon material. Here, the beam cannot ablate past lower region 401 in some embodiments.

Figure 7:
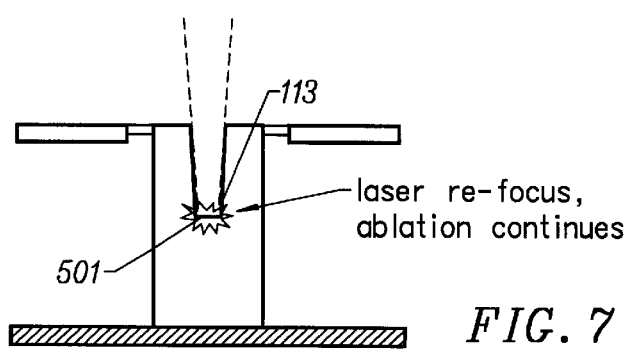
Figure 8:
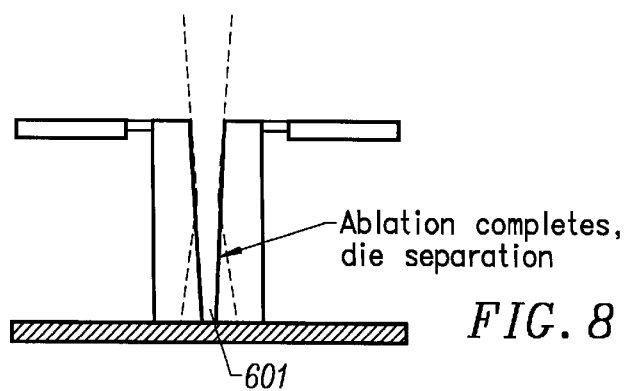

Accordingly, the method adjusts a relative height between the holder and source to adjust the focus region to a second focus region 501, as shown in FIG. 7. Now, the beam has enough power to begin ablating again and continues to ablate until the two die that are adjacent to each other are separated from each other, as shown in FIG. 8, for example. The present method for adjusting the focus point multiple times can be performed in a stepped wise manner using either the stage coupled to the laser source or the stage coupled to the holder. Alternatively, both stages, if available, may be used. Still further, the method can adjust lenses to readjust the beam from the laser source. Alternatively, the method of adjusting the focus point along a thickness of the tab can be performed in a continuous manner, where the z-height between the tab and source is adjusted continuously, alternatively, the method of adjusting the focus point can occur using a combination of steps and continuous actions, depending upon the application.

Next, the method aligns the wafer to target the next tab on the street. The method directs the beam to the next tab on the street; and ablates the tab on the street using the beam. In particular, the beam is targeted to a first focus region on a tab on a street. As noted the beam is directed to the first focus region on the tab on the street. The first focus region receives a focused beam from a converging source and focuses it via optical lens, which is coupled to the beam. Once the beam impinges on the scribe line and in particular the tab, the beam ablates the tab, which is silicon. The ablation occurs until an opening or trench is formed. As the beam ablates, the beam diverges and becomes weaker, where it has difficulty in any further removal of silicon material. Here, the beam cannot ablate past lower region in some embodiments.

Accordingly, the method adjusts a relative height between the holder and source to adjust the focus region to a second focus region, as previously illustrated. Now, the beam has enough power to begin ablating again and continues to ablate until the two die that are adjacent to each other are separated from each other. The present method for adjusting the focus point multiple times can be performed in a stepped wise manner using either the stage coupled to the laser source or the stage coupled to the holder. Alternatively, both stages, if available, may be used. Still further, the method can adjust lenses to readjust the beam from the laser source. Alternatively, the method of adjusting the focus point along a thickness of the tab can be performed in a continuous manner, where the z-height between the tab and source is adjusted continuously, alternatively, the method of adjusting the focus point can occur using a combination of steps and continuous actions, depending upon the application.

The method repeats the steps of directing the beam to the next tab and ablating the tab. The method continues to repeat until one (or more) of the die has been separated from the substrate. The method above is illustrated in a specific sequence of steps. Such sequence of steps may be performed alone or in combination with others, which are described or not even described. The steps can be performed in the order shown or in other orders, if desired. The steps also can be performed using a combination of hardware and software using other process steps. The steps also can be performed using hardware or other processes implemented using software and the like. Of course, there can be many other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for fabricating an array of mirrors disposed on a die from a substrate, the method comprising:

placing a substrate comprising a plurality of die thereon on a stage, each of the die comprising a plurality of to be movable mirror devices in an array configuration, each die comprising a peripheral region defining a street that surrounds the array configuration;

forming a plurality of tabs that join one die to another die in the street of the substrate, each of the tabs also being separated from each other in a sequential manner by a recessed region between at least two of the tabs, wherein the street is defined by the tabs and the recessed region defined therebetween in a sequential manner; and directing a beam of high intensity electromagnetic radiation at the street between the one die and the other die to ablate each of the tabs that joins the one die to the other die to separate the one die from the other die to free the die comprising the mirror array from the other dice on the substrate.

2. The method of claim 1 wherein each of the mirror device comprising a plurality of torsion bars that hold the mirror device in place.

3. The method of claim 1 wherein the substrate is a silicon wafer.

4. The method of claim 1 wherein the recessed region is defined along the entire thickness of the substrate.

5. The method of claim 1 wherein the high intensity light is an Nd:YAG source.

6. The method of claim 1 wherein each of the tabs comprises a thickness of at least 100 microns.

7. The method of claim 1 wherein each of the tabs comprises a thickness of at least 200 microns.

8. The method of claim 1 wherein the tab forming step comprises reactive ion etching.

9. The method of claim 1 wherein the tab forming step comprises a first masking and etching step to form a recessed tab region and a second etching step to define openings between each of the tabs.

10. The method of claim 8 wherein the reactive ion etching comprises a deep reactive ion etching process.

11. A method of fabricating an array of mirrors disposed on a die from a substrate, the method comprising:

placing a substrate comprising a plurality of die thereon on a stage, each of the die comprising a plurality of to be movable mirror devices in an array configuration, each die comprising a peripheral region defining at least one street that defines a border between one die from another die, the street having at least one tab that joins the one die to another die, the tab having a thickness of at least 100 microns, the thickness including an upper region that extends to a lower region;

etching the street to reduce a thickness of the street using a deep reactive ion etching process from an inductively coupled plasma source to produce a region having a depth to width ratio of at least five and greater, while forming a coating on vertical edges of the etched street region to prevent substantial etching in a later direction.

12. The method of claim 11 wherein each of the mirror device comprising a plurality of torsion bars that hold the movable mirror device in place.

13. The method of claim 11 wherein the substrate is selected from a silicon wafer.

14. The method of claim 11 wherein the recessed region is defined along the entire thickness of the substrate.

15. The method of claim 11 wherein the street has a width of more than 50 microns.

16. The method of claim 11 further comprising ablating the tab using a high energy radiation source.

17. The method of claim 11 wherein each of the tabs comprises a thickness of at least 200 microns.

18. The method of claim 11 wherein the substrate comprises a surface defined by an x and y coordinate, the substrate comprising the thickness defined by a z coordinate.

19. The method of claim 18 wherein the upper portion of the tab is defined by a z coordinate that is spatially closer to a source of the beam than a z-coordinate that defines the lower portion of the tab.

20. A method for forming an array of movable mirror devices, the method comprising:

placing a substrate comprising a plurality of die thereon on a stage, each of the die comprising a plurality of to be movable mirror devices, each of the to be movable mirror devices having a cavity region defined around each of the mirror devices, in an array configuration, each die comprising a peripheral region defining at least one street that defines a border between one die from another die, the street having at least one tab that joins the one die to another die, the tab having a thickness of at least 100 microns, the thickness including an upper region that extends to a lower region;

simultaneously etching the cavity region and the street to reduce a thickness of the street using a deep reactive ion etching process from an inductively coupled plasma source to produce a region having a depth to width ratio of at least five and greater, while forming each of the movable mirror devices.

* * * * *